(12) United States Patent
Halevy

(10) Patent No.: US 7,461,302 B2
(45) Date of Patent: Dec. 2, 2008

(54) SYSTEM AND METHOD FOR I/O ERROR RECOVERY

(75) Inventor: Ben Zion Halevy, Tel-Aviv (IL)

(73) Assignee: Panasas, Inc., Pittsburgh, PA (US)

( * ) Notice: Subject to any disclaimer, the term of this patent is extended or adjusted under 35 U.S.C. 154(b) by 326 days.

(21) Appl. No.: 10/918,201

(22) Filed: Aug. 13, 2004

(65) Prior Publication Data

US 2006/0036891 A1 Feb. 16, 2006

(51) Int. Cl.
*G06F 11/00* (2006.01)
*G06F 11/07* (2006.01)
*G06F 11/16* (2006.01)

(52) U.S. Cl. .............................. 714/54; 714/5; 714/57; 709/223; 709/224

(58) Field of Classification Search ................ 714/57, 714/5, 42, 49, 54; 709/223, 224
See application file for complete search history.

(56) References Cited

U.S. PATENT DOCUMENTS

| | | | | |
|---|---|---|---|---|
| 5,708,775 A * | 1/1998 | Nakamura | ............... | 714/48 |
| 5,892,898 A * | 4/1999 | Fujii et al. | ............... | 714/57 |
| 5,941,996 A * | 8/1999 | Smith et al. | ............... | 714/47 |
| 6,243,838 B1 * | 6/2001 | Liu et al. | ............... | 714/57 |
| 6,581,156 B1 * | 6/2003 | Meyer | ............... | 712/244 |
| 6,735,721 B1 * | 5/2004 | Morrow et al. | ............... | 714/57 |
| 6,826,580 B2 * | 11/2004 | Harris et al. | ............... | 707/202 |
| 6,854,071 B2 * | 2/2005 | King et al. | ............... | 714/8 |
| 7,024,595 B2 * | 4/2006 | Fujimoto | ............... | 714/54 |
| 7,231,634 B2 * | 6/2007 | Harres | ............... | 717/125 |
| 2003/0188035 A1 * | 10/2003 | Lubbers et al. | ............... | 709/310 |
| 2004/0068561 A1 * | 4/2004 | Yamamoto et al. | ............... | 709/224 |
| 2004/0153741 A1 * | 8/2004 | Obara | ............... | 714/7 |

OTHER PUBLICATIONS

Google definition of i/o found by typing "define: i/o" (without quotations) into a Google search field.*

* cited by examiner

*Primary Examiner*—Scott T. Baderman
*Assistant Examiner*—Joseph Schell
(74) *Attorney, Agent, or Firm*—Morgan, Lewis & Bockius LLP

(57) ABSTRACT

A system and method for recovering from an I/O error in a distributed object-based storage system that includes a plurality of object storage devices for storing object components, a manager coupled to each of the object storage devices, wherein the object storage devices coordinate with the file manager, and one or more clients that access and store distributed, object-based files on the object storage devices. A client attempts to perform an operation selected from the group consisting of: a data read operation from an object storage device, a data write operation to an object storage device, a set attribute operation to an object storage device, a get attribute operation from an object storage device and a create object operation to an object storage device. Upon failure of the operation, the client sends a message from the client to the manager that includes information representing a description of the failure.

8 Claims, 2 Drawing Sheets

| OBD1 | OBD2 | OBD3 | OBD4 |
|------|------|------|------|
| C    | A    | B    | P    |

| OBD1 | OBD2 | OBD3 | OBD4 |
|------|------|------|------|
| X    | X    | B'   | P    |

| OBD1 | OBD2 | OBD3 | OBD4 |
|------|------|------|------|
| C'   | A'   | B'   | P'   |

SYSTEM AND METHOD FOR I/O ERROR RECOVERY

FIELD OF THE INVENTION

The present invention generally relates to data storage methodologies, and, more particularly, to systems and methods for recovery from I/O errors in distributed object-based storage systems in which a client implements RAID algorithms.

BACKGROUND OF THE INVENTION

With increasing reliance on electronic means of data communication, different models to efficiently and economically store a large amount of data have been proposed. A data storage mechanism requires not only a sufficient amount of physical disk space to store data, but various levels of fault tolerance or redundancy (depending on how critical the data is) to preserve data integrity in the event of one or more disk failures.

In a traditional RAID networked storage system, a data storage device, such as a hard disk, is connected to a RAID controller and associated with a particular server or a particular server having a particular backup server. Thus, access to the data storage device is available only through the server associated with that data storage device. A client processor desiring access to the data storage device would, therefore, access the associated server through the network and the server would access the data storage device as requested by the client. In such systems, RAID recovery is performed in a manner that is transparent to the file system client.

By contrast, in a distributed object-based data storage system that uses RAID, each object-based storage device communicates directly with clients over a network. An example of a distributed object-based storage system is shown in co-pending, commonly-owned, U.S. patent application Ser. No. 10/109,998, filed on Mar. 29, 2002, titled "Data File Migration from a Mirrored RAID to a Non-Mirrored XOR-Based RAID Without Rewriting the Data," incorporated by reference herein in its entirety.

In many failure scenarios in a distributed object-based file system, the failure can only be correctly diagnosed and corrected by a system manager that knows about and can control system specific devices. For example, a failure can be caused by a malfunctioning object-storage device and the ability to reset such device is reserved for security reasons only to the system manager unit. Therefore, when a client fails to write to a set of objects, the client needs to report that failure to the system manager so that the failure can be diagnosed and corrective actions can be taken. In addition, the file system manager must take steps to repair the object's parity equation.

In instances where a client fails to write to a set of objects, it would be desirable if the role of the system manager was not limited to repairing the error condition, but also extended to repair of the affected file system object's parity equation. Expansion of the role of the system manager to include correction of the parity equation is advantageous because the system will no longer need to depend on the file system client that encountered a failure to be able to repair the object's parity equation. The present invention provides an improved system and method that, in instances where there is an I/O error, transmits information to the system manager sufficient to permit the system manager to repair the parity equation of the object associated with the I/O error.

SUMMARY OF THE INVENTION

The present invention is directed to recovering from an I/O error in a distributed object-based storage system that includes a plurality of object storage devices for storing object components, a manager coupled to each of the object storage devices, wherein the object storage devices coordinate with the file manager, and one or more clients that access and store distributed, object-based files on the object storage devices.

In one embodiment of the present invention, a client attempts to perform an operation on data that is the subject of the operation, the operation being selected from the group consisting of: a data write operation to an object storage device, a set attribute operation to an object storage device, and a create object operation to an object storage device. Upon failure of the operation, the client sends a single message from the client to the manager that includes information representing a description of the failure and the data that was the subject of the operation. The data that is the subject of the operation may be user-data or parity data. In one embodiment, the distributed object-based system is a RAID system, and the data in the message is used to correct a parity equation associated with the data in the message and other data on one or more of the object storage devices.

In accordance with a further embodiment, a client attempts to perform an operation selected from the group consisting of: a data read operation from an object storage device, a data write operation to an object storage device, a set attribute operation to an object storage device, a get attribute operation from an object storage device, and a create object operation to an object storage device. Upon failure of the operation, a message is sent from the client to the manager that includes information representing a description of the failure. Thus, in contrast to existing distributed object-based systems, in the present invention the client actively participates in failure recovery.

BRIEF DESCRIPTION OF THE DRAWINGS

The accompanying drawings, which are included to provide a further understanding of the invention and are incorporated in and constitute a part of this specification, illustrate embodiments of the invention that together with the description serve to explain the principles of the invention. In the drawings:

FIG. 2A illustrates an exemplary data object formed of components striped across different OBDs;

FIG. 2B illustrates a state of the data object from FIG. 2A after a failure has occurred; and FIG. 2C illustrates a state of the data object from FIG. 2B after recovery from the failure is performed using the present invention.

DETAILED DESCRIPTION OF THE PREFERRED EMBODIMENT

Figure 1:
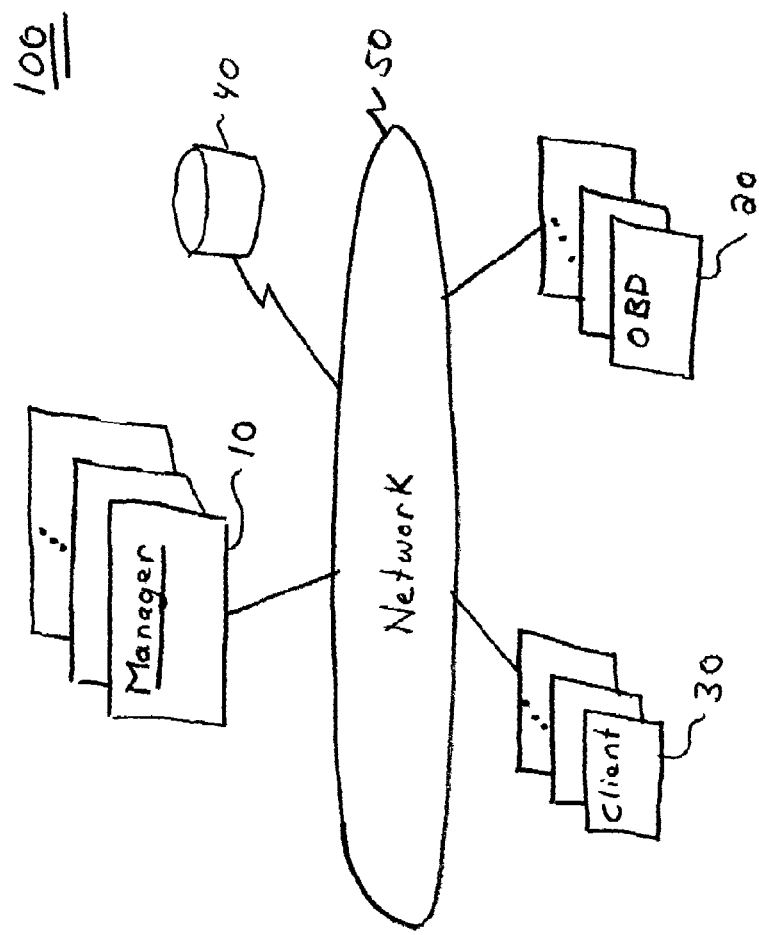
FIG. 1 illustrates an exemplary network-based file storage system designed around Object-Based Secure Disks (OBDs)

Reference will now be made in detail to the preferred embodiments of the present invention, examples of which are illustrated in the accompanying drawings. It is to be understood that the figures and descriptions of the present invention included herein illustrate and describe elements that are of particular relevance to the present invention, while eliminating, for purposes of clarity, other elements found in typical data storage systems or networks.

FIG. 1 illustrates an exemplary network-based file storage system 100 designed around Object Based Secure Disks (OBDs) 20. File storage system 100 is implemented via a combination of hardware and software units and generally consists of manager software (simply, the "manager") 10, OBDs 20, clients 30 and metadata server 40. It is noted that each manager is an application program code or software running on a corresponding server. Clients 30 may run different operating systems, and thus present an operating system-integrated file system interface. Metadata stored on server 40 may include file and directory object attributes as well as directory object contents. The term "metadata" generally refers not to the underlying data itself, but to the attributes or information that describe that data.

FIG. 1 shows a number of OBDs 10 attached to the network 50. An OBD 10 is a physical disk drive that stores data files in the network-based system 100 and may have the following properties: (1) it presents an object-oriented interface (rather than a sector-oriented interface); (2) it attaches to a network (e.g., the network 50) rather than to a data bus or a backplane (i.e., the OBDs 10 may be considered as first-class network citizens); and (3) it enforces a security model to prevent unauthorized access to data stored thereon.

The fundamental abstraction exported by an OBD 10 is that of an "object," which may be defined as a variably-sized ordered collection of bits. Contrary to the prior art block-based storage disks, OBDs do not export a sector interface at all during normal operation. Objects on an OBD can be created, removed, written, read, appended to, etc. OBDs do not make any information about particular disk geometry visible, and implement all layout optimizations internally, utilizing higher-level information that can be provided through an OBD's direct interface with the network 50. In one embodiment, each data file and each file directory in the file system 100 are stored using one or more OBD objects. Because of object-based storage of data files, each file object may generally be read, written, opened, closed, expanded, created, deleted, moved, sorted, merged, concatenated, named, renamed, and include access limitations. Each OBD 10 communicates directly with clients 30 on the network 50, possibly through routers andor bridges. The OBDs, clients, managers, etc., may be considered as "nodes" on the network 50. In system 100, no assumption needs to be made about the network topology except that each node should be able to contact every other node in the system. Servers (e.g., metadata servers 40) in the network 50 merely enable and facilitate data transfers between clients and OBDs, but the servers do not normally implement such transfers.

Logically speaking, various system "agents" (i.e., the managers 10, the OBDs 20 and the clients 30) are independently-operating network entities. Manager 10 may provide day-to-day services related to individual files and directories, and manager 10 may be responsible for all file- and directory-specific states. Manager 10 creates, deletes and sets attributes on entities (i.e., files or directories) on clients' behalf. Manager 10 also carries out the aggregation of OBDs for performance and fault tolerance. "Aggregate" objects are objects that use OBDs in parallel and/or in redundant configurations, yielding higher availability of data and/or higher I/O performance. Aggregation is the process of distributing a single data file or file directory over multiple OBD objects, for purposes of performance (parallel access) and/or fault tolerance (storing redundant information). In one embodiment, the aggregation scheme associated with a particular object is stored as an attribute of that object on an OBD 20. A system administrator (e.g., a human operator or software) may choose any supported aggregation scheme for a particular object. Both files and directories can be aggregated. In one embodiment, a new file or directory inherits the aggregation scheme of its immediate parent directory, by default. Manager 10 may be allowed to make layout changes for purposes of load or capacity balancing.

The manager 10 may also allow clients to perform their own I/O to aggregate objects (which allows a direct flow of data between an OBD and a client), as well as providing proxy service when needed. As noted earlier, individual files and directories in the file system 100 may be represented by unique OBD objects. Manager 10 may also determine exactly how each object will be laid out—i.e., on which OBD or OBDs that object will be stored, whether the object will be mirrored, striped, parity-protected, etc. Manager 10 may also provide an interface by which users may express minimum requirements for an object's storage (e.g., "the object must still be accessible after the failure of any one OBD").

Each manager 10 may be a separable component in the sense that the manager 10 may be used for other file system configurations or data storage system architectures. In one embodiment, the topology for the system 100 may include a "file system layer" abstraction and a "storage system layer" abstraction. The files and directories in the system 100 may be considered to be part of the file system layer, whereas data storage functionality (involving the OBDs 20) may be considered to be part of the storage system layer. In one topological model, the file system layer may be on top of the storage system layer.

A storage access module (SAM) (not shown) is a program code module that may be compiled into managers and clients. The SAM includes an I/O execution engine that implements simple I/O, mirroring, map retrieval, striping and RAID parity algorithms discussed below. (For purposes of the present invention, the term RAID refers to any RAID level or configuration including, e.g., RAID-1, RAID-2, RAID-3, RAID-4 and RAID-5, etc.) The SAM also generates and sequences the OBD-level operations necessary to implement system-level I/O operations, for both simple and aggregate objects.

Each manager 10 maintains global parameters, notions of what other managers are operating or have failed, and provides support for up/down state transitions for other managers. A benefit to the present system is that the location information describing at what data storage device (i.e., an OBD) or devices the desired data is stored may be located at a plurality of OBDs in the network. Therefore, a client 30 need only identify one of a plurality of OBDs containing location information for the desired data to be able to access that data. The data may be returned to the client directly from the OBDs without passing through a manager.

FIG. 2A illustrates an exemplary data object formed of components A, B and C which are striped across different OBDs 20. A parity value (P) is associated with components A, B, C and stored on one of the OBDs 20. In the present invention, when a client 30 attempts to perform an operation on a data object (e.g., object 200), and the operation fails for any reason, client 30 sends a single message from the client 30 to the manager 10 that includes information representing a description of the failure and any data that was the subject of the operation. More specifically, when client 30 attempts to perform a data read operation from an OBD 20, a data write operation to an OBD 20, a set attribute operation to an OBD 20, or a get attribute operation from an OBD 20, and the attempt results in an I/O failure, the client 30 sends a single message from the client 30 to the manager 10 that includes information representing a description of the failure and any data (e.g., data object 200) that was the subject of the operation. Data that was the subject of the operation may alternatively be user-data or parity data. For certain operations such as a data read operation from an OBD 20 or a get attribute operation from OBD 20, there will be no data that was the subject of a failed operation and, in such cases, the message from the client 30 to the manager 10 may only include information representing a description of the failure.

In one embodiment (illustrated by the example below), where the distributed object-based storage system is a RAID storage system, the portion of the message sent from client 30 to manager 10 that includes the data that was the subject of the failed I/O operation is used by manager 10 to correct a parity equation associated with such data and other data on one or more of the object storage devices. Referring now to FIG. 2A, components A, B and C of object 200 are striped across different OBDs 20, and a parity equation value (P) associated with object 200 may be stored on a further OBD 20. When the OBDs 20 containing components A, B and C are operating in a non-degraded mode, the parity equation may represented as equation (1) below:

$$(P) = A \oplus B \oplus C \quad (1)$$

Next, assume that a client 30 attempts a write operation to segments A, B, C, and P of object 200, and the write operation for A' and C' fails (this condition is shown in FIG. 2B). C' fails because OBD1 had suffered a permanent failure, while the write of A' failed due to a transient failure (i.e., OBD2 is actually functional). In accordance with the present invention, client 30 will, in response to the failure, return to manager 10 both a description of the failure and the data that was being written (A' and C'). Using information from the message, and probing the OBDs reported in the error log, manager 10 can deduce that OBD1 has permanently failed, and OBD2 is functional. Moreover, manager 10 can also correct the parity equation associated with object 200 because manager 10 also possesses the data that client 30 attempted to write. The parity equation is corrected by ensuring A' and P' have been written to their respective OBDs (this condition is shown in FIG. 2C). Had the client had not forwarded the data, such a recovery would have been impossible. The parity corrected equation is represented by equation (2) below:

$$(P') = A' \oplus B \oplus C' \quad (2)$$

Finally, it will be appreciated by those skilled in the art that changes could be made to the embodiments described above without departing from the broad inventive concept thereof. It is understood, therefore, that this invention is not limited to the particular embodiments disclosed, but is intended to cover modifications within the spirit and scope of the present invention as defined in the appended claims.

What is claimed is:

1. In a distributed object-based storage system that includes a plurality of object storage devices for storing object components, a manager coupled to each of the object storage devices, wherein the object storage devices coordinate with the manager, and one or more clients that access and store distributed, object-based files on the object storage devices, a method for recovering from an I/O error, comprising:

attempting, by a client, to perform a data storage operation wherein the client attempts to store data that is the subject of the operation on one or more of the object storage devices, the operation selected from the group consisting of: a data write operation to an object storage device, a set attribute operation to an object storage device, and an object create operation to an object storage device; and upon failure of the operation, sending a single message from the client to the manager that includes (a) information representing a description of the failure and (b) the data that the client attempted to store that was the subject of the operation.

2. The method of claim 1, wherein the data that is the subject of the operation and that the client attempted to store is user-data or parity data.

3. The method of claim 1, further comprising using the data in the message, a parity equation associated with the data in the message and other data on one or more of the object storage devices, to correct data associated with the failure.

4. The method of claim 1, wherein the distributed object-based system is a RAID system.

5. In a distributed object-based storage system that includes a plurality of object storage devices for storing object components, a manager coupled to each of the object storage devices, wherein the object storage devices coordinate with the manager, and one or more clients that access and store distributed, object-based files on the object storage devices, a system for recovering from an 110 error, comprising:

a client that attempts to perform a data storage operation where the client attempts to store data that is the subject of the operation on one or more of the object storage devices, the operation selected from the group consisting of: a data write operation to an object storage device, a set attribute operation to an object storage device, and a create object operation from to an object storage device; and wherein, upon failure of the operation, the client sends a single message from the client to the manager that includes (a) information representing a description of the failure and (b) the data that the client attempted to store that was the subject of the operation.

6. The system of claim 5, wherein the data that is the subject of the operation and that the client attempted to store is user-data or parity data.

7. The system of claim 5, wherein said system uses the data in the message, a parity equation associated with the data in the message and other data on one or more of the object storage devices, to correct data associated with the failure.

8. The method of claim 5, wherein the distributed object-based system is a RAID system.

* * * * *